US006647869B2

(12) United States Patent
Bornhorst et al.

(10) Patent No.: US 6,647,869 B2
(45) Date of Patent: Nov. 18, 2003

(54) POSITIVE LOCK FOR INFINITE ADJUSTABLE STROKE MECHANISM

(75) Inventors: John B. Bornhorst, New Bremen, OH (US); Richard J. Oen, Wapakoneta, OH (US); Charles H. Dickman, Minster, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 10/113,402

(22) Filed: Apr. 2, 2002

(65) Prior Publication Data

US 2003/0183095 A1 Oct. 2, 2003

(51) Int. Cl.[7] .............................. B30B 5/00; B30B 1/06; F16C 3/04; B21J 7/46

(52) U.S. Cl. ......................... 100/257; 100/282; 74/595; 72/441

(58) Field of Search ................................. 100/257, 282, 100/283, 285, 286, 280; 72/441, 450, 451, 452; 74/571 L, 602, 603, 600, 595; 83/628, 530

(56) References Cited

U.S. PATENT DOCUMENTS

| | | | | | |
|---|---|---|---|---|---|
| 2,454,881 | A | * | 11/1948 | Michelman | 74/571 R |
| 3,765,266 | A | * | 10/1973 | Portmann | 74/571 M |
| 4,160,409 | A | | 7/1979 | Portmann | |
| 4,538,336 | A | * | 9/1985 | Oliver | 29/426.6 |
| 4,711,169 | A | | 12/1987 | Imanishi et al. | |
| 4,748,883 | A | | 6/1988 | Portmann | |
| 4,785,732 | A | * | 11/1988 | Czapka et al. | 100/257 |
| 4,846,014 | A | | 7/1989 | Shiga et al. | |
| 4,914,977 | A | | 4/1990 | Kato | |
| 5,127,256 | A | | 7/1992 | Shiga et al. | |
| 5,189,928 | A | * | 3/1993 | Ontrop et al. | 74/603 |
| 5,307,709 | A | | 5/1994 | Bareis et al. | |
| 5,351,576 | A | | 10/1994 | Matsui et al. | |
| 5,513,561 | A | | 5/1996 | Biliskov, Jr. | |
| 5,813,322 | A | * | 9/1998 | Kuroda | 100/43 |
| 5,865,070 | A | | 2/1999 | Bornhorst et al. | |

* cited by examiner

*Primary Examiner*—Allen Ostrager
*Assistant Examiner*—Jimmy Nguyen
(74) *Attorney, Agent, or Firm*—Randall J. Knuth

(57) ABSTRACT

A positive lock for infinite adjustable stroke alignment mechanism for a mechanical press with an eccentric bushing disposed within a press connection member with a second eccentric member disposed within the eccentric bushing. A rotatable crankshaft is connected to the second eccentric member. A positive lock alignment mechanism is included for aligning the press connection member with the eccentric bushing to prevent rotation therebetween and permitting rotation of the second eccentric member with the eccentric bushing for infinite stroke adjustment whereby rotation of the crankshaft, when the mechanism is activated causes a press stroke adjustment.

12 Claims, 3 Drawing Sheets

POSITIVE LOCK FOR INFINITE ADJUSTABLE STROKE MECHANISM

BACKGROUND OF THE INVENTION

1. Field of the Invention

The present invention relates to a mechanical stamping and drawing presses, and, more particularly, to an apparatus for a positive lock for infinite adjustable stroke connection for adjusting the stroke length.

2. Description of the Related Art

In mechanical presses, it is often desirable to adjust or change the stroke length of a reciprocating member, for example the slide, to which a stamping tool is installed. In some prior art tooth adjustment systems, there is a tendency of the system parts to wear after a certain period of operation time. It would be desirable to provide an apparatus or system which may be utilized to quickly, easily and accurately adjust the stroke length of a slide or other parts while ensuring alignment of the stroke connection system. In addition, in some mechanical presses with an indefinite adjustable stroke mechanism, there will be a small amount of slippage from one connection to a second connection on a press with the connections and eccentric on a crankshaft after hundreds of stroke changes. Thus, if one of the eccentric bushings rotates a percentage of degree in relation to the secondary eccentric on the crankshaft during the stroke adjustment process, this will cause the stroke mechanism to be out of adjustment.

SUMMARY OF THE INVENTION

The present invention provides an alignment connection for use in a dual eccentric adjustable stroke connection system for use in changing the stroke length of the slide or other member of the mechanical press such as described in U.S. Pat. No. 5,865,070.

An eccentric on a rotatable crankshaft is supplied within an eccentric bushing disposed thereon. A press connection member, such as a connecting rod or link, is attached about the eccentric bushing. During normal operations, there is a relative movement between the eccentric bushing and the connecting member arm to thereby cause reciprocation of the press slide. During stroke adjustment, pressure oil is communicated between the eccentric bushing and the crankshaft eccentric, thereby relieving the press fit or interference fit there between, and causing the eccentric bushing to expand and form a temporary press fit connection with the connecting arm. At this time, the crankshaft may be rotated, along with its eccentric, to thereby change the position of the eccentric within the eccentric bushing. This causes a change of the stroke length. The oil pressure is then relieved thereby causing the eccentric bushing to contract and again form a press fit with the crankshaft eccentric and release the temporary press fit connection between the outside of the eccentric bushing and the connection member arm. After such oil pressure has been reduced, normal press operations may proceed. During normal operations and repeated press operations and stroke adjustments, there can be slippage between the larger eccentric bushing and the connection arm after repeated stroke changes. Thus, if one of the eccentric bushings rotates a percentages of a degree in relation to the secondary eccentric on the crankshaft during the stroke adjustment process, this will cause the slide parallelism from the bottom of the slide to the top of the bolster on the bed to be out of specification. The addition of the positive lock for infinite adjustable stroke and alignment mechanism ensures that during the stroke adjustment process, no movement or slippage will occur and the stroke adjustment will be made uniformly and accurately during each stroke adjustment.

The invention comprises, in one form thereof, a mechanical press having a press connection member, an eccentric bushing disposed within the press connection member, and a second eccentric member disposed within the eccentric bushing. The second eccentric member releasably connectable within the eccentric bushing. A rotatable crankshaft is connected to the second eccentric member. The invention includes a system for connecting the eccentric bushing with the press connection member to prevent rotation there between and permitting rotation of a second eccentric member within the eccentric bushing whereby rotation of the crankshaft, when the system is activated, causes a press stroke adjustment. The invention also includes an alignment connection means that secures the press connection member or multiple press connection members to the eccentric bushings at a predetermined position that ensures the proper positioning of each and every eccentric within the adjustable stroke bushing.

The invention comprises, in another form thereof, a double acting cylinder means for activating the alignment means, such as a U-bar, into and out of the key ways provided for proper alignment of the eccentric bushing and the press connecting members. The alignment means includes a spring to hold the U-bar open so that the U-bar and the eccentric bushing never come in contact and causes a collision when the eccentric bushing is rotating and fixed to the crankshaft.

An advantage of the present invention is that the mechanical presses may now include a positive lock for infinite adjustable stroke alignment mechanism to ensure simple and compact stroke adjustment connections operated by fluid pressure. This is an improvement over prior stock adjustment connections that utilize keys and/or gearing between the crankshaft and the various eccentrics and ensures no slippage or movement of the larger eccentric and connection arms during stroke adjustment operated by fluid pressure.

Another advantage of the present invention is that mechanical presses with infinite adjustable stroke mechanisms will have a small amount of slippage from one connector to the other connector on a press with multiple connection members and their respective eccentric bushings on a crankshaft after hundreds of stroke changes. The present invention will prevent rotational movement of the eccentric bushing in relation to the secondary eccentric on the crankshaft and the bearing cap not to move out of specification, during the time the press stroke is being adjusted.

Another advantage of the present invention is that the alignment mechanism can be used with the simple and compact stroke adjustment connection operated by fluid pressure. The present invention utilizes a connection that is simple in design and vastly reduces the number of parts necessary for a stroke adjustment mechanism and a method to ensure proper alignment.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
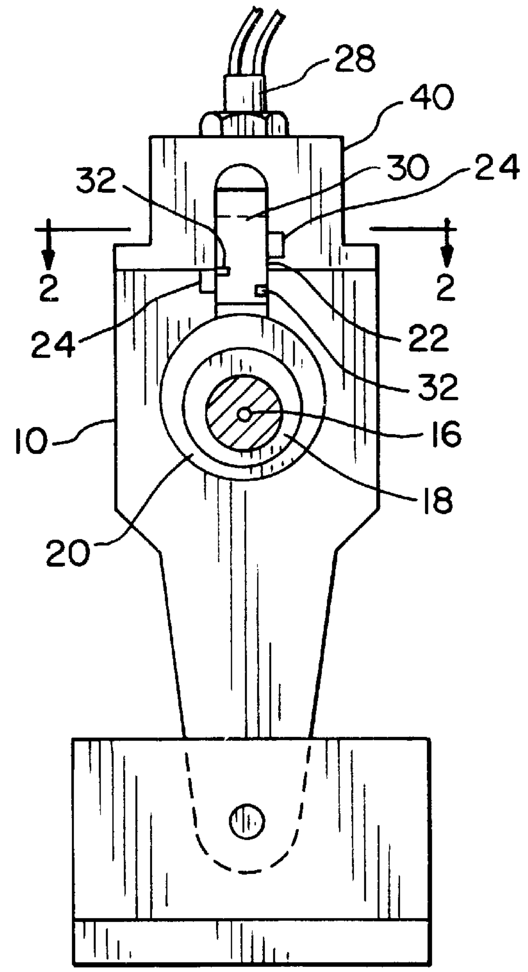
FIG. 1 is a schematic, prospective view in a partial cut away of a portion of the crankshaft and slide connection.

Corresponding reference characters indicate corresponding parts throughout the several views. Although the drawings represent embodiments of the present invention, the drawings are not necessarily to scale and certain features may be exaggerated or omitted in order to better illustrate and explain the present invention.

DETAILED DESCRIPTION OF THE INVENTION

Figure 5:
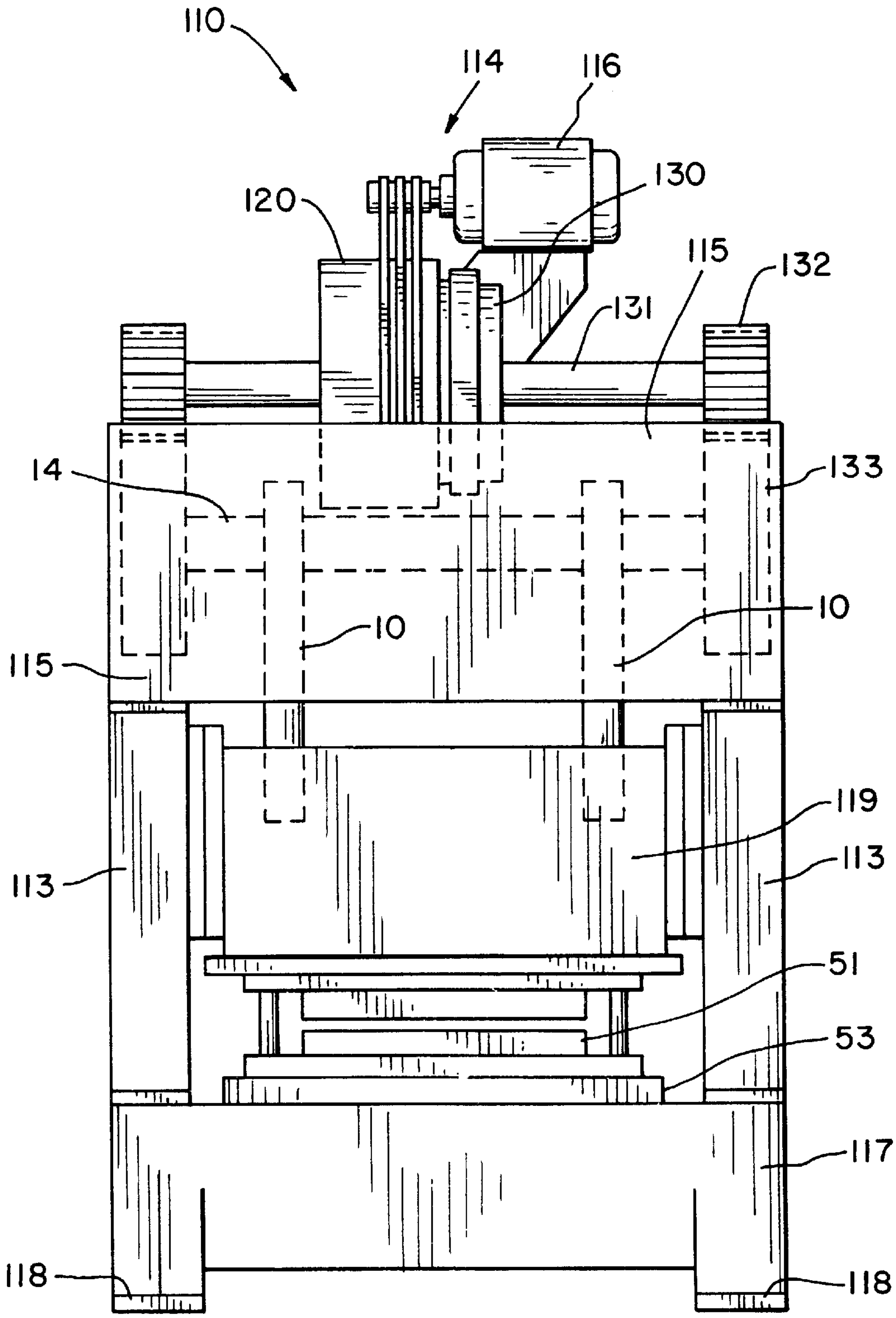
FIG. 5 is an elevational view of a typical mechanical press utilizing the present invention.

The positive lock for the infinite adjustable stroke mechanism of the present invention is ideally suited for a wide assortment of configurations of mechanical and stamping presses utilizing one or more connections. As is conventional, a mechanical press 110 (wherein FIG. 5) typically includes a crown portion 115, a bed portion 117 having a booster assembly connected thereto, and uprights 113 connecting crown portion 115 with the bed portion 117. Uprights 113 are connected to or integral with the underside of crown portion 115 and the upper side bed portion 117. A slide 119 is positioned between uprights 113 for a guided, reciprocating movement relative to bed portion 117. Tie rods (not shown), which extend through crown portion 115, uprights 113 and bed portion 117, are attached with each end with the tie rod nuts. Leg members 118 are formed as an extension of the bed and are generally mounted on the shop floor by means of shock absorbing pads.

In order to power the reciprocating motion of slide 119, a drive mechanism 114 for the press is provided. The drive mechanism 114 includes a motor 116, a clutch 130, a press drive shaft 131 and a flywheel 120. The press driveshaft 131 is connected to a pinion 132 which rotates crankshaft 14. A flywheel 120 is connected to a main flywheel 133 which in turns selectively engages the clutch of the combination clutch brake to power rotation of the press crankshaft 14, which in turn effects slide motion via connections extending between the slide and the crankshaft. This description of press 110 and its drive mechanism is merely illustrative. A wide variety of mechanical presses are well known in the art, and the use of the present invention can be utilized with any mechanical press that utilizes a crankshaft type device to achieve reciprocating motion of a press component. An example of a mechanical press is disclosed in U.S. Pat. No. 5,189,928 entitled "Adjustable Stroke Punch Press", which is incorporated herein by reference.

Referring to FIG. 1, there is schematically shown a cross-sectional view of a crankshaft main portion 16, its associated eccentric bushing 20 and connection 10 which is powered by the crankshaft rotation. The connection may be formed of a bottom portion and a cap, and the bottom portion of connection member 10 is attached in a suitable fashion to the press slide. The crankshaft 14 includes a cylindrical main portion 16 axially centered on the crankshaft axis of rotation and a second eccentric member such as a cylindrical eccentric 18, rotatably fixed thereto or integrally formed therewith. Although only one crankshaft eccentric is shown, multiple eccentrics and connection members 10 would be provided along the axial length of the crankshaft to cooperate with additional connectors which are not shown. Ringing crankshaft eccentric 18 is an eccentric bushing with a keyway 22 to receive an alignment bar 30 to ensure proper alignment during press stroke adjustment.

Figure 2:
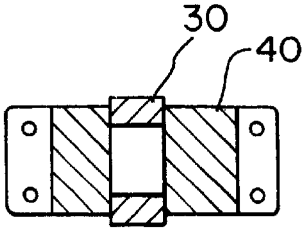
FIG. 2 is a cross-sectional view along line E—E of FIG. 1 of the cylinder support and alignment bar.

FIG. 2 is a cross-sectional view of cylindrical support 40 and alignment bar 30.

Figure 3A:
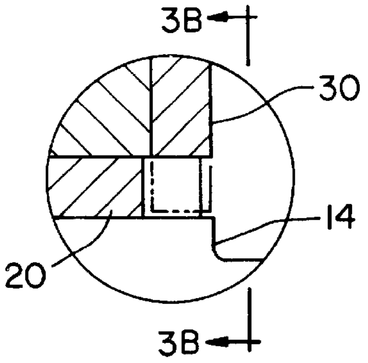
FIGS. 3*a* and 3*b* are cross-sectional views along the line H—H of FIG. 1 and along the line F—F of FIG. 3*a* respectively, along the crankshaft axis at several times of operation, namely during normal stamping operations and during stroke length/eccentric adjustment.
Figure 3B:
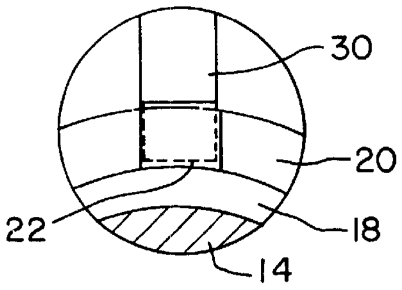

FIGS. 3*a* and 3*b* illustrate the configuration of the alignment mechanism in the position for production and the position during stroke change. In FIG. 3*a*, alignment bar 30 is in the upright position and is not engaging eccentric bushing 20 or crankshaft 14. This allows crankshaft 14 and eccentric bushing 20 to rotate freely during production without a collision. In FIG. 3*b*, alignment bar 30 is shown lowered into eccentric bushing 20 for positive lock position during stroke change.

Figure 4:
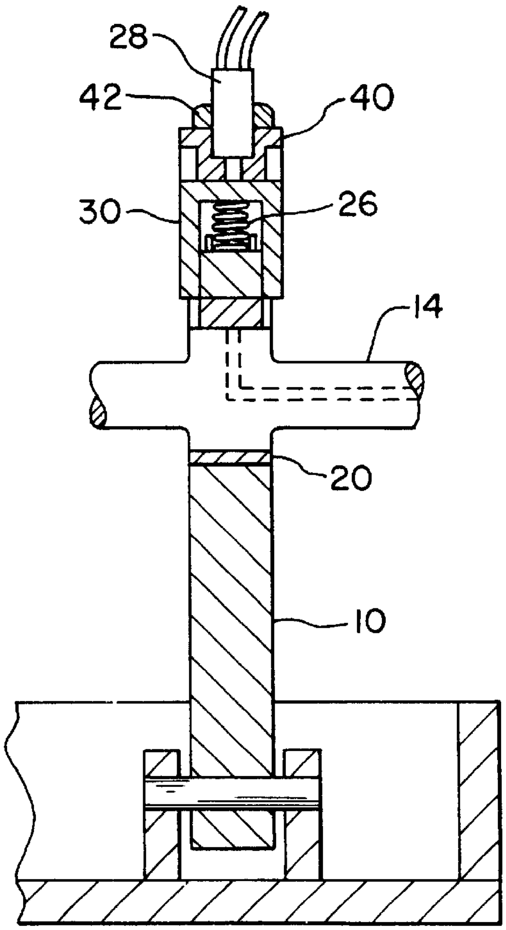
FIG. 4 is an axial, cross-sectional view of the press mechanisms showing the crankshaft and connections along with the cylinder support for the alignment mechanisms.

FIGS. 1 and 4 better illustrate the configuration of these components, wherein the crankshaft main portion 16 is shown with crankshaft eccentric 18 and eccentric bushing 20 as these components would appear during normal press operation. Alignment bar 30 is now removed or in the up position and removed from keyway 22 as it would be positioned or appear during normal stamping operation. A double acting cylinder 28 and a spring 26 (shown in FIG. 4) to hold alignment bar 30 in the upward position so eccentric bushing 20 is affixed to the crankshaft and rotates with the crankshaft and alignment 30, and never communicates into keyway 22 and thus cause a collision with the rotating crankshaft. Found on the sides of keyway 22 are two sensors 24 that detect whether alignment bar 30 is in the up position or the down position through the use of upper limit switch 34 which indicates alignment bar 30 is up, and lower limit switch 32 which indicates that alignment bar 30 is down and engaging eccentric bushing 20, as shown in FIG. 3*a*. Not shown in the figures is a keyway on both sides of connection member 10. Alignment bar 30 can be a U-shaped bar to engage a similar keyway on the opposite of connection member 10.

FIG. 3*a* depicts the invention with alignment bar 30 lowered into keyway 22 and engaged within eccentric bushing 20 for press stroke adjustment by hydraulic oil pressure as described in U.S. No. Pat. 5,865,070 entitled "Adjustable Stroke Connection". As depicted in FIG. 3*a*, alignment bar 30 has been lowered into keyway 22 by double acting cylinder 28, shown in FIGS. 1 and 4, so as to affix alignment bar 30 into eccentric bushing 20 to make stroke adjustments. The mechanical press is stopped and crankshaft eccentric 18 and eccentric bushing 20 are aligned on top with keyway 22 in alignment with alignment bar 30. A double acting cylinder 28 pushes alignment bar 30 into keyway 22 of eccentric bushing 20 and electric sensor 24 detects when lower limit switch 32 indicates alignment bar 30 is in the proper position. In this position, eccentric bushing 28 and the cap of connection member 10 are all locked together. The chamber (not shown) inside eccentric bushing 20 is pressurized relieving the press fit between crankshaft 14 and eccentric bushing 20, and creating the press fit between the cap 16 of connection member 10 and eccentric bushing 20. At this time, crankshaft 14 can be rotated to whatever desired stroke position is desired and need in the press operation. Once the desired stroke position is obtained, the high pressure oil (not shown) between eccentric bushing 20 and crankshaft 14 is halted thereby creating the clearance between connection member 10 and eccentric bushing 20. Double acting cylinder 28 can be energized raising alignment bar 30 (as shown in FIG. 3*b*) until upper limit switch 34 activates sensor 24 putting alignment bar 30 into the position depicted in FIG. 3*a*. Spring 26 additionally holds alignment 30 in the up position during mechanical press operation.

While this invention has been described as having a preferred design, the present invention can be further modified within the spirit and scope of this disclosure. This patent application is therefore intended to cover any variations, uses, or adaptations of the present invention using its general principals. Further, this patent application is intended to cover such departures from the present disclosure as come within known or customary practice in the art to which this invention pertains and which fall within the limits of the appended claims.

What is claimed is:

1. A mechanical press comprising:

a press connection member;

an eccentric bushing disposed within said press connection member;

a second eccentric member disposed within said eccentric bushing creating an interface therebetween, said second eccentric member releasably connectable with said eccentric bushing;

a rotatable crankshaft connected to said second eccentric member;

a means for connecting said eccentric bushing with said press connection member by a temporary press fit to prevent rotation there between whereby rotation of said crankshaft when said means is activated then causes a press stroke adjustment; and a means for aligning said press connection member and said eccentric bushing during said press stroke adjustment, said alignment means being mounted in said press connection member, said alignment means being selectively actuatable into a positive lock position with said eccentric bushing, said positive lock position with said eccentric bushing defining a first limit of movement for said alignment means.

2. The press of claim 1 in which said connecting means comprises fluid pressure applied to the interface between said second eccentric and said eccentric bushing whereby said such pressure permits relative rotation between said second eccentric member and said eccentric bushing while said alignment means engages said eccentric bushing.

3. The press of claim 1 in which said connecting means comprises fluid pressure applied to the interface between said second eccentric member and said eccentric bushing that causes said eccentric bushing and said press connection to connect together by temporary press fit connection while said alignment means is engaged by said eccentric bushing.

4. The press of claim 3 in which said connection means is in operative communication with said crankshaft.

5. The press of claim 3 wherein said second eccentric member and said eccentric bushing form a press fit therebetween prior to creation of said temporary press fit connection.

6. The press of claim 1 in which said connection means which is in operative communication with said crankshaft.

7. The press of claim 1 in which said eccentric bushing includes an internal cavity in communication with said second eccentric member.

8. The press of claim 1 in which said eccentric bushing includes at least one keyway therein, each said keyway being configured for receiving said alignment means therein.

9. The press of claim 1 where said alignment means is a bar which engages said eccentric bushing.

10. The press of claim 1 where said means of alignment operates through a double acting cylinder.

11. The press of claim 1 where said means of alignment includes a detection means to detect the position of said alignment means.

12. A mechanical press comprising:

a press connection member;

an eccentric bushing disposed within said press connection member;

a second eccentric member disposed within said eccentric bushing creating an interface therebetween, said second eccentric member releasably connectable with said eccentric bushing;

a rotatable crankshaft connected to said second eccentric member;

a means for connecting said eccentric bushing with said press connection member by a temporary press fit to prevent rotation there between whereby rotation of said crankshaft when said means is activated then causes a press stroke adjustment; and a means for aligning said press connection member and said eccentric bushing during said press stroke adjustment, said means of alignment including at least one of a double acting cylinder and a spring to hold the alignment means in position to ensure that the alignment means and connection member do not collide during the operation of the press.

* * * * *